(12) United States Patent
Joko

(10) Patent No.: US 10,998,728 B2
(45) Date of Patent: May 4, 2021

(54) POWER SUPPLY CONTROL METHOD, POWER MANAGEMENT SERVER, CONTROL APPARATUS, AND POWER SUPPLY CONTROL SYSTEM

(71) Applicant: KYOCERA Corporation, Kyoto (JP)

(72) Inventor: Shingo Joko, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 37 days.

(21) Appl. No.: 16/479,925

(22) PCT Filed: Jan. 26, 2018

(86) PCT No.: PCT/JP2018/002557
§ 371 (c)(1),
(2) Date: Jul. 23, 2019

(87) PCT Pub. No.: WO2018/139602
PCT Pub. Date: Aug. 2, 2018

(65) Prior Publication Data
US 2019/0372350 A1 Dec. 5, 2019

(30) Foreign Application Priority Data

Jan. 27, 2017 (JP) .............................. JP2017-012840

(51) Int. Cl.
*G05B 15/02* (2006.01)
*H02J 3/32* (2006.01)
(Continued)

(52) U.S. Cl.
CPC ................ *H02J 3/32* (2013.01); *G05B 15/02* (2013.01); *H02J 13/0017* (2013.01); *H02J 3/383* (2013.01)

(58) Field of Classification Search
CPC .......... H02J 3/32; H02J 13/0017; H02J 3/383; H02J 13/00; G05B 15/02; Y02B 90/20;
(Continued)

(56) References Cited

U.S. PATENT DOCUMENTS

2006/0276938 A1* 12/2006 Miller .................... G06Q 50/06
700/295
2014/0042978 A1 2/2014 Nishibayashi et al.
(Continued)

FOREIGN PATENT DOCUMENTS

JP 2013-169104 A 8/2013
JP 2014-39353 A 2/2014
(Continued)

*Primary Examiner* — Christopher E. Everett
(74) *Attorney, Agent, or Firm* — Hauptman Ham, LLP

(57) ABSTRACT

A power supply control method includes a step A of determining, by a power management server managing at least one facility connected to a power grid, an adjustment plan for adjusting demand and supply balance of the power grid by using at least one storage battery apparatus provided in the facility. The method includes a step B of transmitting, from the power management server to a control apparatus managed by the power management server, a control message for controlling the storage battery apparatus, based on the adjustment plan. The method includes a step C of transmitting, from the control apparatus to the power management server, reserved capacity information specifying a reserved capacity reserved as a capacity to be used for adjustment of demand and supply balance of the power grid in a storage capacity of the storage battery apparatus.

13 Claims, 9 Drawing Sheets

(51) Int. Cl.
*H02J 13/00* (2006.01)
*H02J 3/38* (2006.01)

(58) Field of Classification Search
CPC .......... Y04S 20/00; Y04S 10/30; Y04S 10/14; Y02E 10/56; Y02E 70/30; Y02E 60/00
See application file for complete search history.

(56) References Cited

U.S. PATENT DOCUMENTS

| | | |
|---|---|---|
| 2014/0239913 A1 | 8/2014 | Kudo et al. |
| 2015/0002100 A1 | 1/2015 | Kudo et al. |
| 2017/0070089 A1 | 3/2017 | Fukubayashi et al. |
| 2018/0090987 A1 | 3/2018 | Hashimoto |

FOREIGN PATENT DOCUMENTS

| | | |
|---|---|---|
| JP | 2014-128107 A | 7/2014 |
| JP | 2015-186290 A | 10/2015 |
| WO | 2013/042474 A1 | 3/2013 |
| WO | WO2013/042475 A1 | 3/2015 |
| WO | 2015/136920 A1 | 9/2015 |
| WO | 2016/158899 A1 | 10/2016 |

\* cited by examiner

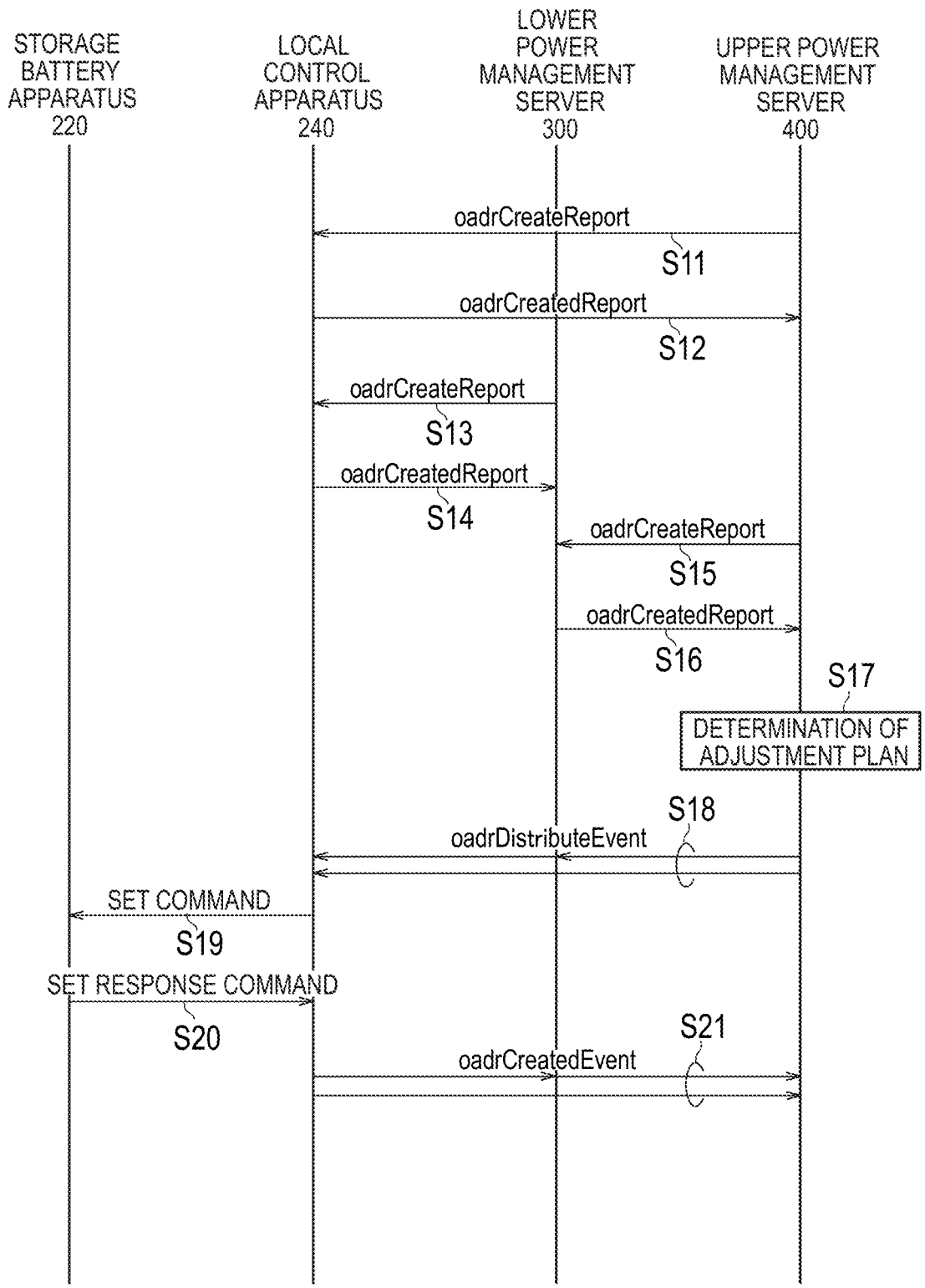

POWER SUPPLY CONTROL METHOD, POWER MANAGEMENT SERVER, CONTROL APPARATUS, AND POWER SUPPLY CONTROL SYSTEM

RELATED APPLICATIONS

The present application is a National Phase of International Application No. PCT/JP2018/002557, filed Jan. 26, 2018, and claims priority based on Japanese Patent Application No. 2017-012840, filed Jan. 27, 2017.

TECHNICAL FIELD

The present invention relates to a power supply control method, a power management server, a control apparatus, and a power supply control system.

BACKGROUND ART

In recent years, a technology of suppressing a load flow rate from a power grid to a facility or a reverse load flow rate from the facility to the power grid in order to maintain power demand and supply balance of the power grid has been known (for example, Patent Literatures 1 and 2). In detail, the load flow rate or the reverse load flow rate is suppressed by transmitting a control message from a power management server to a control apparatus.

CITATION LIST

Patent Literature

Patent Literature 1: Japanese application publication No. 2013-169104
Patent Literature 2: Japanese application publication No. 2014-128107

SUMMARY OF INVENTION

A power supply control method according to a first aspect comprises a step A of determining, by a power management server managing at least one facility connected to a power grid, an adjustment plan for adjusting demand and supply balance of the power grid by using at least one storage battery apparatus provided in the facility, a step B of transmitting, from the power management server to a control apparatus managed by the power management server, a control message for controlling the storage battery apparatus, based on the adjustment plan, and a step C of transmitting, from the control apparatus to the power management server, reserved capacity information specifying a reserved capacity reserved as a capacity to be used for adjustment of demand and supply balance of the power grid in a storage capacity of the storage battery apparatus. The step A includes a step of determining the adjustment plan based on the reserved capacity information.

A power management server according to a second aspect manages at least one facility connected to a power grid. The power management server comprises a controller configured to determine an adjustment plan for adjusting demand and supply balance of the power grid by using at least one storage battery apparatus provided in the facility, a transmitter configured to transmit, to a control apparatus managed by the power management server, a control message for controlling the storage battery apparatus, based on the adjustment plan, and a receiver configured to receive, from the control apparatus, reserved capacity information specifying a reserved capacity reserved as a capacity to be used for adjustment of demand and supply balance of the power grid in a storage capacity of the storage battery apparatus. The controller determines the adjustment plan based on the reserved capacity information.

A control apparatus according to a third aspect managed by a power management server managing at least one facility connected to a power grid. The control apparatus comprises a receiver configured to receive, from the power management server, a control message for controlling at least one storage battery apparatus provided in the facility, and a transmitter configured to transmit, to the power management server, reserved capacity information specifying a reserved capacity reserved as a capacity to be used for adjustment of demand and supply balance of the power grid in a storage capacity of the storage battery apparatus. The control message is transmitted based on an adjustment plan for adjusting the demand and supply balance of the power grid by using the storage battery apparatus. The adjustment plan is determined based on the reserved capacity information.

A power supply control system according to a forth aspect comprises a power management server configured to manage at least one facility connected to a power grid, and a control apparatus configured to be managed by the power management server. The power management server determines an adjustment plan for adjusting demand and supply balance of the power grid by using at least one storage battery apparatus provided in the facility. The power management server transmits, to the control apparatus, a control message for controlling the storage battery apparatus. The control apparatus transmits reserved capacity information specifying a reserved capacity reserved as a capacity to be used for adjustment of demand and supply balance of the power grid in a storage capacity of the storage battery apparatus. The power management server determines the adjustment plan based on the reserved capacity information.

BRIEF DESCRIPTION OF DRAWINGS

FIG. 11 is a view illustrating a power supply control method according to an embodiment.

DESCRIPTION OF EMBODIMENTS

Figure 1:
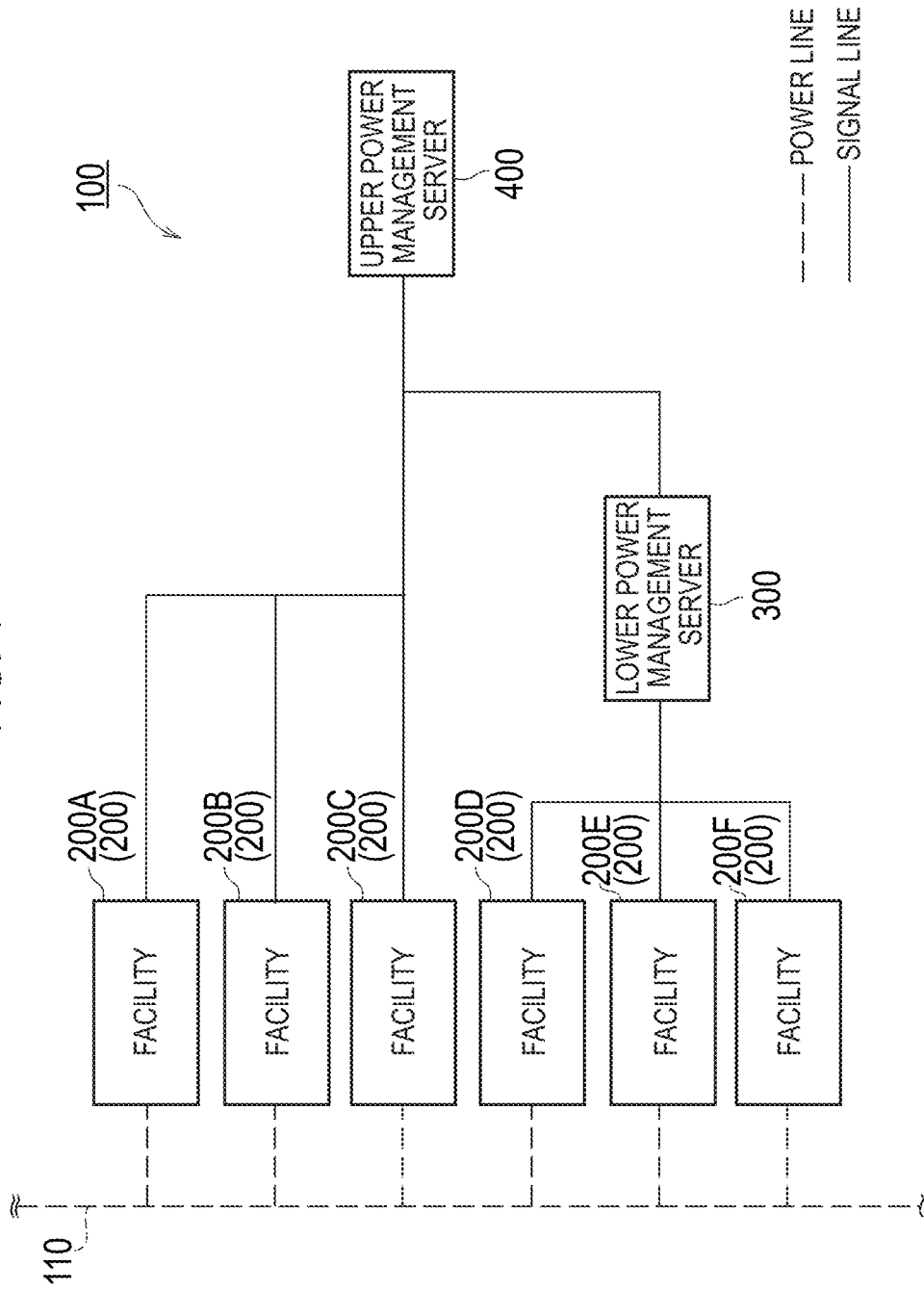
FIG. 1 is a view illustrating a power supply control system 100 according to an embodiment.

In recent years, a virtual power plant (VPP) which uses a distributed power supply provided in a facility for adjustment of power demand and supply balance of a power grid has received attention. As the distributed power supply, for example, a storage battery apparatus is used.

In this case, power stored in the storage battery apparatus is not only used to adjust the power demand and supply balance of the power grid, but also consumed by a load provided in the facility. Accordingly, in a case where a power management server does not check a remaining amount of power stored in the storage battery apparatus, which is usable for the adjustment of the power demand and supply balance of the power grid, it is not possible to appropriately adjust the power demand and supply balance of the power grid.

In this regard, the present disclosure provides a power supply control method, a power management server, a control apparatus, and a power supply control system which enable convenient and appropriate adjustment of power demand and supply balance of a power grid by using a storage battery apparatus provided in a facility.

Hereinafter, an embodiment will be described with reference to the drawings. It should be noted that the same or similar components are denoted by the same or similar reference numeral in a description with reference to the drawings.

However, it should be noted that the drawings are schematic, and ratios of respective dimensions and the like may be different from actual ones. Therefore, specific dimensions and the like should be determined in consideration of the following description. Further, it is a matter of course that parts having different dimensional relationships or ratios among the drawings are included.

Embodiment (Power Supply Control System)

Hereinafter, a power supply control system according to an embodiment will be described.

As illustrated in FIG. 1, a power supply control system 100 includes a lower power management server 300, a facility 200, and an upper power management server 400. In FIG. 1, as the facility 200, facilities 200A to 200F are illustrated.

Each facility 200 is connected to a power grid 110. Hereinafter, a flow of power from the power grid 110 to the facility 200 is referred to as a load flow, and a flow of power from the facility 200 to the power grid 110 is referred to as a reverse load flow.

The facility 200, the lower power management server 300, and the upper power management server 400 are connected with one another through a network. The network may provide a circuit between the facility 200 and the lower power management server 300, a circuit between the facility 200 and the upper power management server 400, and a circuit between the lower power management server 300 and the upper power management server 400. Examples of the network include the Internet. The network may provide a dedicated circuit such as a virtual private network (VPN) or the like.

In FIG. 1, a dotted line represents a power line, and a solid line represents a signal line.

Figure 2:
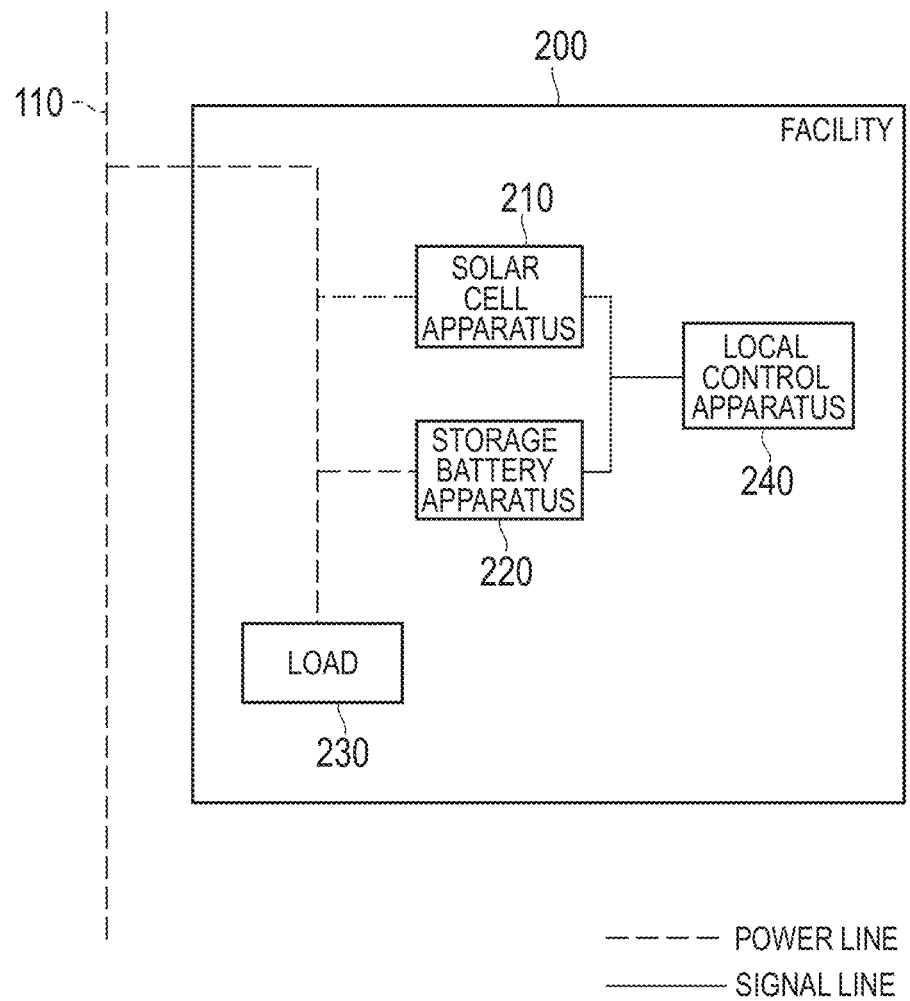
FIG. 2 is a view illustrating a facility 200 according to an embodiment.

As illustrated in FIG. 2, the facility 200 includes a solar cell apparatus 210, a storage battery apparatus 220, a load 230, and a local control apparatus 240.

The solar cell apparatus 210 is a distributed power supply which generates power based on light such as sunlight. The solar cell apparatus 210 is an example of a distributed power supply of which a reverse load flow to the power grid 110 is allowed. The solar cell apparatus 210 may be constituted by, for example, a power conditioning system (PCS) and a solar panel.

The storage battery apparatus 220 is a distributed power supply which performs charging of power and discharging of power. The storage battery apparatus 220 is an example of a distributed power supply of which a reverse load flow to the power grid 110 is allowed. The storage battery apparatus 220 may be constituted by, for example, a PCS and a storage battery cell. The solar cell apparatus 210 and the storage battery apparatus 220 may be power supplies used in a virtual power plant (VPP).

The load 230 is equipment consuming power. Examples of the load 230 include air-conditioning equipment, lighting equipment, audio visual equipment, and the like.

The local control apparatus 240 is an apparatus (energy management system (EMS)) which manages power of the facility 200. In the embodiment, the local control apparatus 240 is an example of a power management apparatus which manages one facility 200. The local control apparatus 240 may control an operation state of the solar cell apparatus 210, or may control an operation state of the storage battery apparatus 220 provided in the facility 200. The local control apparatus 240 will be described in detail later (see FIG. 4).

In FIG. 2, a dotted line represents a power line, and a solid line represents a signal line.

The lower power management server 300 is a server which manages at least one facility 200 (the facilities 200D to 200F in FIG. 1). In the embodiment, the lower power management server 300 is an example of a power management apparatus which manages two or more facilities 200. The lower power management server 300 is a server managed by an operator such as a power producer, a power transmission and distribution operator or a power retailer, and the like.

The upper power management server 400 is a server which manages at least one facility 200 (the facilities 200A to 200C in FIG. 1). The upper power management server 400 may also manage at least one facility 200 (the facilities 200D to 200F in FIG. 1) through the lower power management server 300. The upper power management server 400 is a server managed by an operator such as a power producer, a power transmission and distribution operator or a power retailer and the like.

The upper power management server 400 may transmit, to the local control apparatus 240 provided in the facility 200, a control message instructing the local control apparatus 240 to control the distributed power supply (for example, the storage battery apparatus 220) provided in the facility 200. For example, the upper power management server 400 may transmit a load flow control message (for example, a demand response (DR)) for requiring a control of the load flow, or may transmit a reverse load flow control message for requiring a control of the reverse load flow. In addition, the upper power management server 400 may transmit a power supply control message for controlling an operation state of the distributed power supply. A degree of the control of the load flow or the reverse load flow may be expressed by an absolute value (for example, ○○kW), or may be expressed by a relative value (for example, ○○%). Alternatively, the degree of the control of the load flow or the reverse load flow may also be expressed by two or more levels. The degree of the control of the load flow or the reverse load flow may be expressed by a power rate (real time pricing (RTP)) determined based on current power demand and supply balance, or may be expressed by a power rate (time of use (TOU)) determined based on past power demand and supply balance.

Such a control message may not only be transmitted from the upper power management server 400 to the local control apparatus 240, but also be transmitted from the upper power management server 400 to the lower power management server 300. Further, the control message may be transmitted from the lower power management server 300 to the local control apparatus 240.

In the embodiment, communication between the lower power management server 300 and the local control apparatus 240, communication between the upper power management server 400 and the local control apparatus 240, and communication between the lower power management server 300 and the upper power management server 400 are performed according to a first protocol. Meanwhile, communication between the local control apparatus 240 and the distributed power supply (for example, the storage battery apparatus 220) is performed according to a second protocol which is different from the first protocol. As the first protocol, for example, a protocol conforming to Open automated demand response (ADR), or a unique dedicated protocol can be used. As the second protocol, for example, a protocol conforming to ECHONET Lite, smart energy profile (SEP) 2.0, KNX, or a unique dedicated protocol can be used. It is sufficient that the first protocol and the second protocol are different from each other, and for example, it is sufficient that the first protocol and the second protocol are protocols created according to different rules even in a case where the first protocol and the second protocol are unique dedicated protocols.

(Power Management Server)

Figure 3:
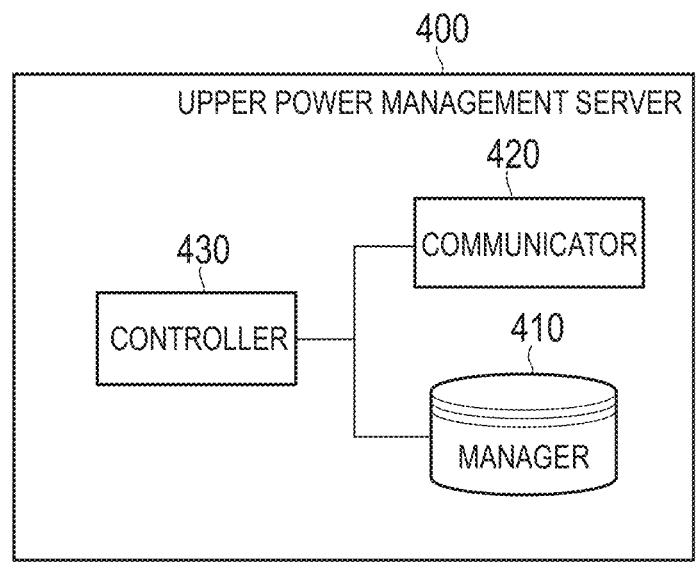
FIG. 3 is a view illustrating an upper power management server 400 according to an embodiment.

Hereinafter, a power management server according to the embodiment will be described. As illustrated in FIG. 3, the upper power management server 400 includes a manager 410, a communicator 420, and a controller 430. The upper power management server 400 is an example of a virtual top node (VTN).

The manager 410 is implemented by a non-volatile memory and/or a storage medium such as HDD and manages data about the facility 200. Examples of the data about the facility 200 include a type of the distributed power supply (the solar cell apparatus 210 or the storage battery apparatus 220) provided in the facility 200, a specification of the distributed power supply (the solar cell apparatus 210 or the storage battery apparatus 220) provided in the facility 200, and the like. The specification may be a rated generated power of the solar cell apparatus 210, a rated output power of the storage battery apparatus 220, and the like.

The communicator 420 is implemented by a communication module, and performs communication with the local control apparatus 240 through the network. As described above, the communicator 420 performs communication according to the first protocol. For example, the communicator 420 transmits a first message to the local control apparatus 240 according to the first protocol. The communicator 420 receives a first message response from the local control apparatus 240 according to the first protocol.

In the embodiment, the communicator 420 transmits the control message described above to the local control apparatus 240 (Step B). As the control message is transmitted, the demand and supply balance of the power grid 110 is adjusted. The communicator 420 receives, from the local control apparatus 240, reserved capacity information specifying a reserved capacity which is reserved as a capacity to be used for the adjustment of the demand and supply balance of the power grid 110 in a storage capacity of the storage battery apparatus 220 (Step C).

Here, the reserved capacity is a capacity which is not arbitrarily used by the facility 200, and is secured by the upper power management server 400 as the capacity used for the adjustment of the demand and supply balance of the power grid 110. Such a reserved capacity may be a capacity (remaining storage capacity) used for a discharge operation of the storage battery apparatus 220, or may be a capacity (remaining available capacity) used for a charge operation of the storage battery apparatus 220. That is, unless the control by the upper power management server 400 is performed, the storage battery apparatus 220 always secures the reserved capacity in the storage capacity of the storage battery apparatus 220. The reserved capacity may be set separately from an amount of power consumed by the load 230 provided in the facility 200. The reserved capacity may be set separately from an amount of power secured for emergency occurring in the facility 200. The amount of power secured for emergency includes an amount of power that can be consumed at the time of emergency.

The reserved capacity information may be information indicating a proportion (%) of the reserved capacity to the storage capacity of the storage battery apparatus 220, and the storage capacity (Wh). The proportion and the storage capacity may be specified by a message transmitted from the storage battery apparatus 220 to the local control apparatus 240. The storage capacity may be a rated power amount (Wh) represented by an alternating current (AC), or may be a rated power amount (Wh) represented by a direct current (DC). The storage capacity may also be a rated capacity (Ah) represented by the DC. It should be noted that the storage capacity may be estimated based on a difference value of a measured value (W) of an instantaneous value of discharge power, a different value of a measured value (A) of an instantaneous value of a discharge current, and a difference value of a measured value (V) of an instantaneous value of a discharge voltage.

The reserved capacity information may be information indicating an absolute value (Wh) of the reserved capacity. The absolute value may be specified by a message transmitted from the storage battery apparatus 220 to the local control apparatus 240. The absolute value may be a value represented by the AC, or a value represented by the DC.

The reserved capacity information may include information indicating unit power which is at least any one of unit discharge power of the storage battery apparatus 220 and unit charge power of the storage battery apparatus 220. The unit discharge power of the storage battery apparatus 220 may be a value of power that the storage battery apparatus 220 can discharge while maintaining a predetermined value of power, for a predetermined time. The unit charge power of the storage battery apparatus 220 may be a value of power that the storage battery apparatus 220 can charge while maintaining a predetermined value of power, for a predetermined time. The information indicating the unit power may be specified by a message transmitted from the storage battery apparatus 220 to the local control apparatus 240. The information indicating the unit power may be information indicating a minimum value and a maximum value (W) of the discharge power from the storage battery apparatus 220, or may be information indicating a minimum value and a maximum value (A) of the discharge current from the storage battery apparatus 220. The information indicating the unit power may be information indicating a minimum value and a maximum value (W) of charge power to the storage battery apparatus 220, or may be information indicating a minimum value and a maximum value (A) of a charge current to the storage battery apparatus 220.

Here, at least one of the storage capacity and the reserved capacity may be corrected based on a degradation state of the storage battery apparatus 220. Information indicating the degradation state of the storage battery apparatus 220 may be specified by a message transmitted from the storage battery apparatus 220 to the local control apparatus 240.

The controller 430 is implemented by a memory, a CPU, or the like, and controls each component provided in the upper power management server 400. The controller 430 instructs the local control apparatus 240 provided in the facility 200 to control the distributed power supply (for example, the storage battery apparatus 220) provided in the facility 200 by, for example, transmitting the control message. The control message may be the load flow control message, the reverse flow control message, or the power supply control message as described above.

In the embodiment, the controller 430 determines an adjustment plan for adjusting the demand and supply balance of the power grid 110 by using at least one storage battery apparatus 220 provided in the facilities 200 (Step A). In detail, the controller 430 determines the adjustment plan based on the reserved capacity information described above.

Here, the controller 430 may determine the storage battery apparatuses 220 to be used in the adjustment plan in a descending order of magnitude of unit power of the storage battery apparatuses 220. The controller 430 may determine the storage battery apparatuses 220 to be used in the adjustment plan in a descending order of length of adjustment durations calculated based on the unit power and the reserved capacities of the storage battery apparatuses 220. The adjustment duration is a value which can be obtained by dividing the reserved capacity by the unit power. Further, the adjustment duration may be a predetermined time for which the storage battery apparatus 220 can continuously discharge while maintaining a value of the unit discharge power. In addition, the adjustment duration may be a predetermined time for which the storage battery apparatus 220 can continuously charge while maintaining a value of the unit charge power.

(Local Control Apparatus)

Figure 4:
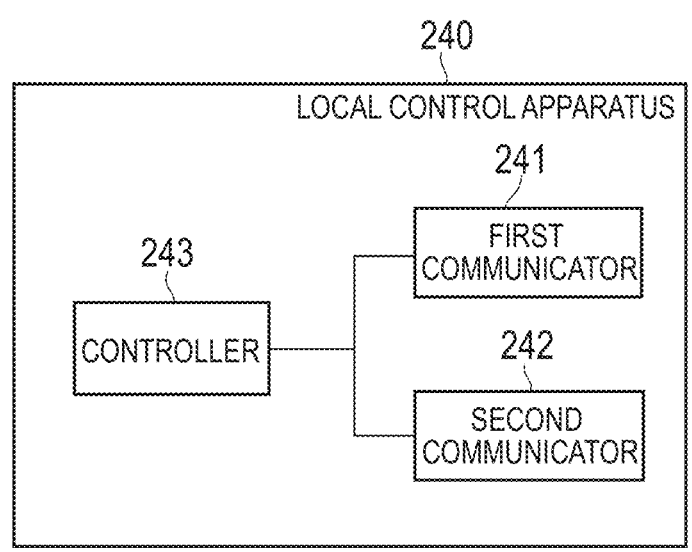
FIG. 4 is a view illustrating a local control apparatus 240 according to an embodiment.

Hereinafter, the local control apparatus according to the embodiment will be described. As illustrated in FIG. 4, the local control apparatus 240 includes a first communicator 241, a second communicator 242, and a controller 243. The local control apparatus 240 is an example of a virtual end node (VEN).

The first communicator 241 is implemented by a communication module, and performs communication with the upper power management server 400 (or the lower power management server 300) through the network. As described above, the first communicator 241 performs communication according to the first protocol. For example, the first communicator 241 receives a first message from the upper power management server 400 (or the lower power management server 300) according to the first protocol. The first communicator 241 transmits a first message response to the upper power management server 400 (or the lower power management server 300) according to the first protocol.

In the embodiment, the first communicator 241 transmits, to the upper power management server 400 (or the lower power management server 300), reserved capacity information specifying a reserved capacity which is reserved as a capacity to be used for the adjustment of the demand and supply balance of the power grid 110 in the storage capacity of the storage battery apparatus 220 (Step C).

The second communicator 242 is implemented by a communication module, and performs communication with the distributed power supply (the solar cell apparatus 210 or the storage battery apparatus 220). As described above, the second communicator 242 performs communication according to the second protocol. For example, the second communicator 242 transmits a second message to the distributed power supply according to the second protocol. The second communicator 242 receives a second message response from the distributed power supply according to the second protocol.

The controller 243 is implemented by a memory, a CPU, or the like, and controls each component provided in the local control apparatus 240. In detail, the controller 243 instructs equipment to set an operation state of the distributed power supply by transmitting the second message and receiving the second message response in order to control power of the facility 200. The controller 243 may instruct the distributed power supply to report information of the distributed power supply by transmitting the second message and receiving the second message response in order to manage power of the facility 200.

(Reserved Capacity)

Hereinafter, a description of the reserved capacity described above will be provided. Here, a case where the adjustment of the demand and supply balance of the power grid 110 is performed by a discharge operation of the storage battery apparatus 220 is described by way of example.

Figure 5:
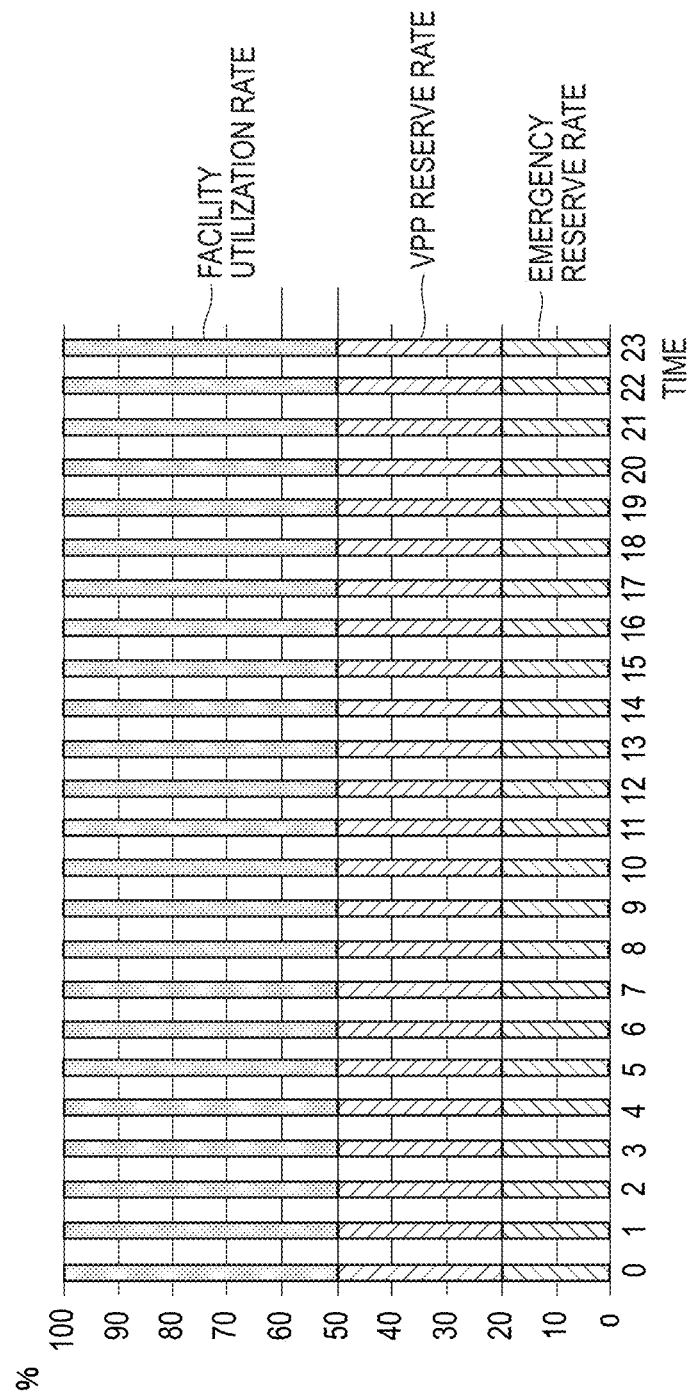
FIG. 5 is a view for describing a reserved capacity according to an embodiment.
Figure 6:
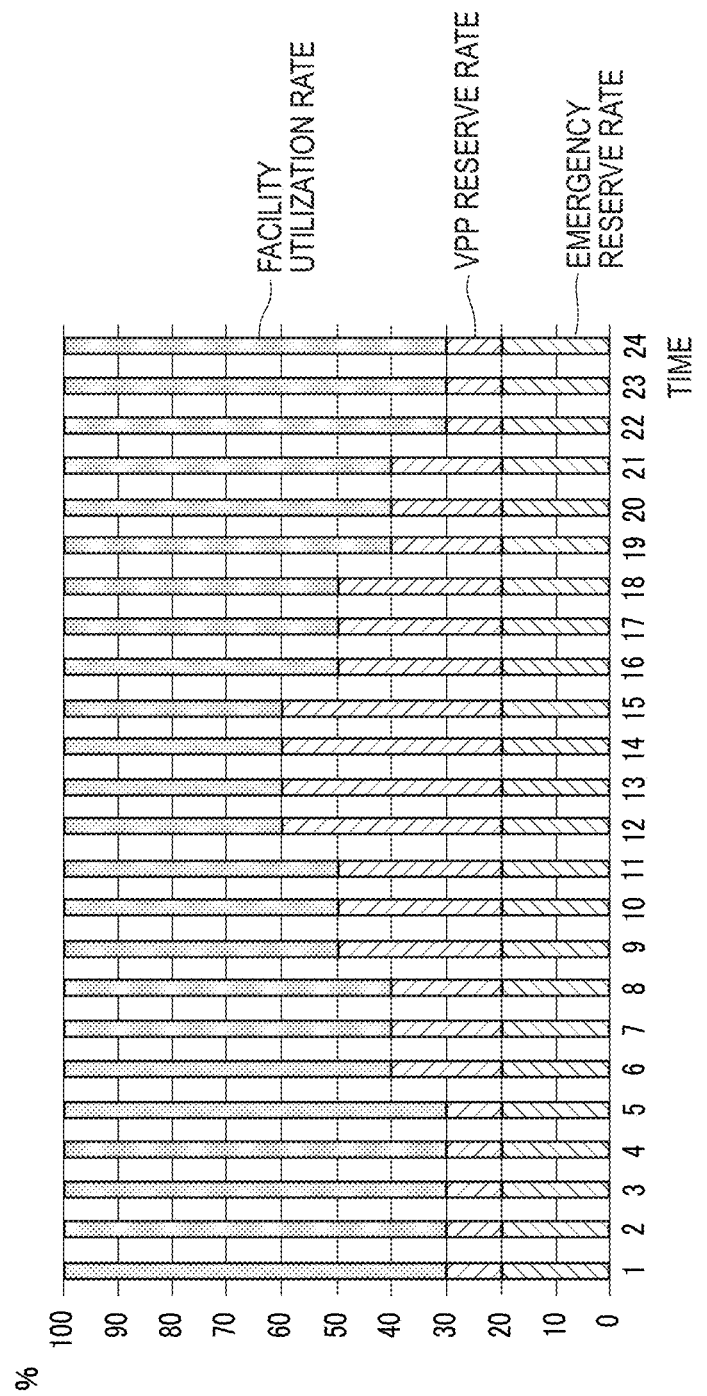
FIG. 6 is a view for describing a reserved capacity according to an embodiment.

As illustrated in FIGS. 5 and 6, in a case where the storage capacity of the storage battery apparatus 220 is 100%, the storage capacity (%) of the storage battery apparatus 220 includes a proportion (facility utilization rate) of an amount of power consumed by the load 230 provided in the facility 200, a proportion (VPP reserve rate) of the reserved capacity which is reserved as a capacity to be used for the adjustment of the demand and supply balance of the power grid 110, and a proportion (emergency reserve rate) of an amount of power secured for emergency occurring in the facility 200. The power secured for emergency includes power that can be consumed at the time of emergency.

The VPP reserve rate may be constant as illustrated in FIG. 5 or may be variable for each hour as illustrated in FIG. 6. In a case where the VPP reserve rate changes for each hour, the facility utilization rate may also be variable for each hour. As illustrated in FIGS. 5 and 6, the emergency reserve rate may be constant.

Figure 7:
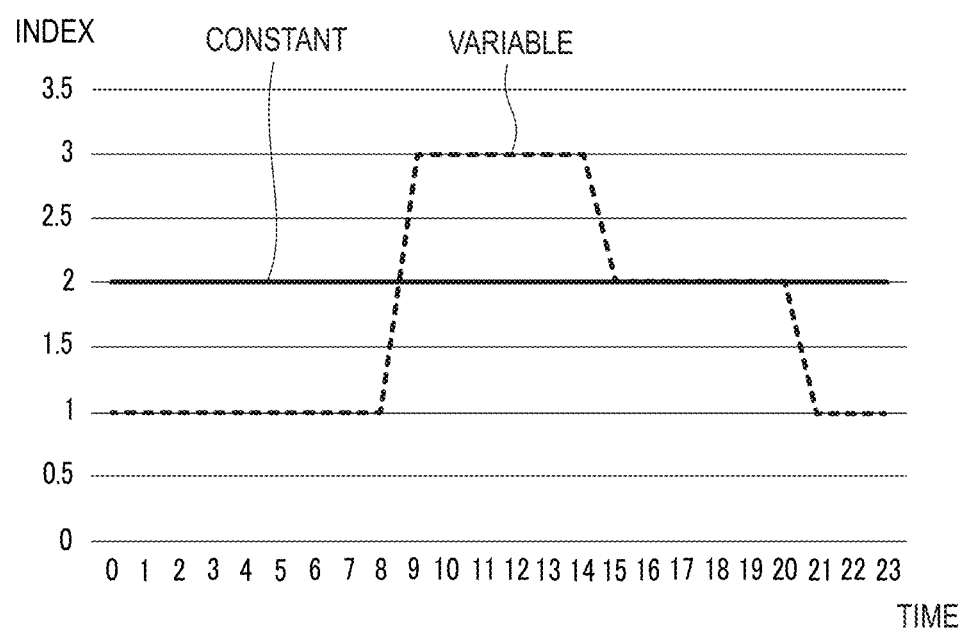
FIG. 7 is a view for describing a reserved capacity according to an embodiment.

In a case where the VPP reserve rate is constant as illustrated in FIG. 5, power that the storage battery apparatus 220 provided in the facility 200 can discharge is constant in the adjustment plan determined by the upper power management server 400 as illustrated in FIG. 7. Meanwhile, in a case where the VPP reserve rate is variable for each hour as illustrated in FIG. 6, power that the storage battery apparatus 220 provided in the facility 200 can discharge is also variable in the adjustment plan determined by the upper power management server 400 as illustrated in FIG. 7. In FIG. 7, a vertical axis represents an index of the power that the storage battery apparatus 220 can discharge, and an index when the VPP reserve rate is constant is 2.

(Adjustment Plan)

Hereinafter, a description of the adjustment plan described above will be provided. Here, a case where the adjustment of the demand and supply balance of the power grid 110 is performed by a discharge operation of the storage battery apparatus 220 is described by way of example.

Figure 8:
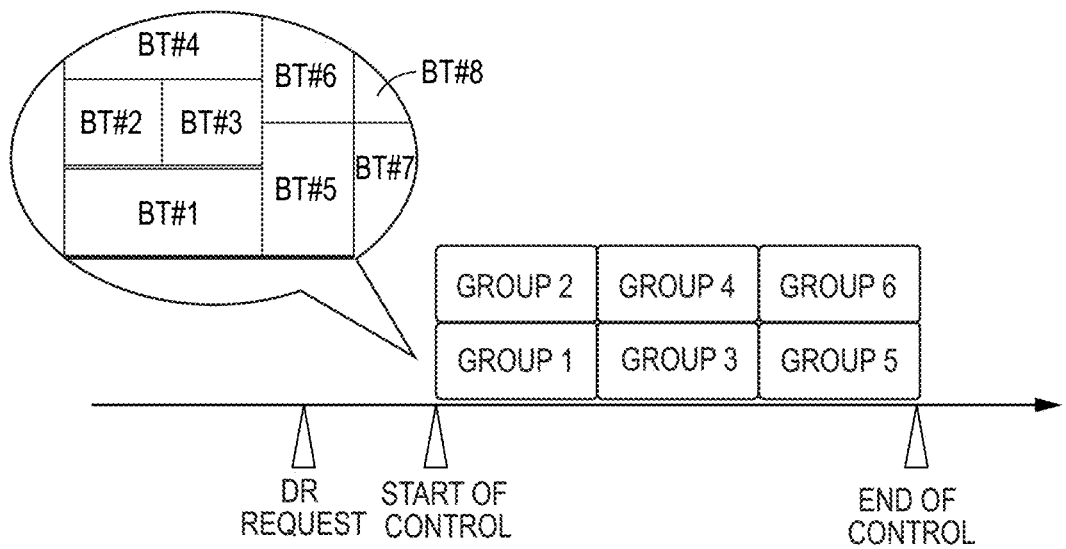
FIG. 8 is a view for describing an operation plan according to an embodiment.

For example, a case where a DR request of 2000 kW□3 hours is issued from a power company or the like is considered. In this case, the upper power management server 400 groups the storage battery apparatuses 220 provided in the facilities 200 into two or more groups when determining the adjustment plan as illustrated in FIG. 8. The upper power management server 400 determines the adjustment plan in a group unit, not in a storage battery apparatus 220 unit. For example, a group 1 includes the storage battery apparatuses 220 such as BT #1 to BT #8.

Here, the upper power management server 400 may group the storage battery apparatuses 220 so that sums of unit power of the storage battery apparatuses 220 belonging to respective groups become equal to one another. In the example illustrated in FIG. 8, a sum of unit power of the storage battery apparatuses 220 belonging to each group is 1000 kW. Similarly, the upper power management server 400 may group the storage battery apparatuses 220 so that sums of adjustment durations of the storage battery apparatuses 220 belonging to respective groups become equal to one another. In the example illustrated in FIG. 8, a sum of adjustment durations of the storage battery apparatuses 220 belonging to each group is one hour.

The upper power management server 400 may perform the grouping described above based on the reserved capacity information before the DR request is issued. The upper power management server 400 may perform the grouping described above based on the reserved capacity information after the DR request is issued. Since the reserved capacity is determined in advance in both cases, the grouping described above is easy.

In the embodiment, the upper power management server 400 may detect a non-operating storage battery apparatus which cannot perform a discharge operation or a charge operation among the storage battery apparatuses used in the adjustment plan (Step N. Such detection may be performed by a message received from the local control apparatus 240. In this case, the upper power management server 400 specifies an alternative storage battery apparatus used as an alternative to the non-operating storage battery apparatus (Step E). In detail, the upper power management server 400 specifies a storage battery apparatus having characteristics similar to unit power of the non-operating storage battery apparatus and a reserved capacity of the non-operating storage battery apparatus, as the alternative storage battery apparatus.

Figure 9:
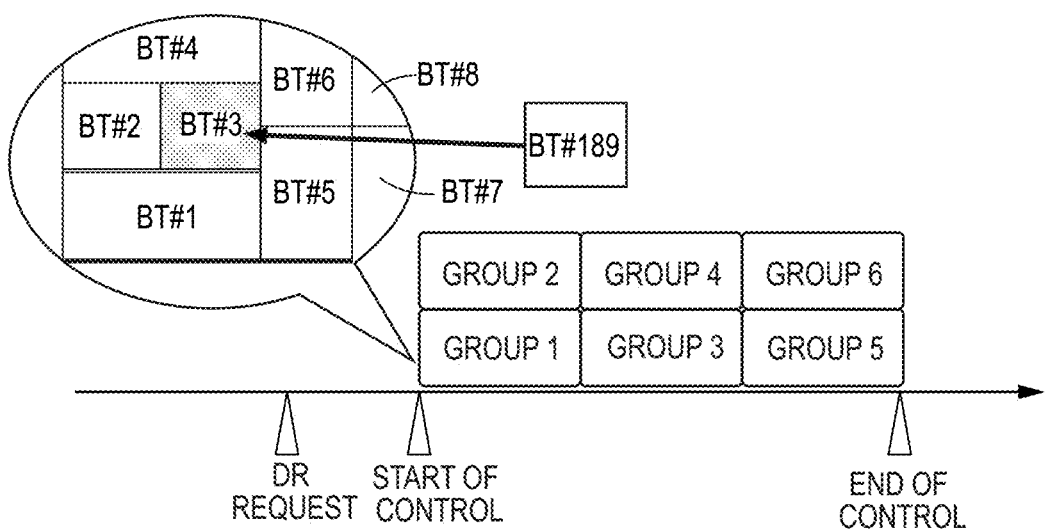
FIG. 9 is a view for describing an operation plan according to an embodiment.

For example, as illustrated in FIG. 9, in a case where a storage battery apparatus 220 of BT #3 belonging to the group 1 cannot perform the discharge operation, the upper power management server 400 specifies a storage battery apparatus 220 of BT #189 having characteristics similar to those of the storage battery apparatus 220 of BT #3 as the alternative storage battery apparatus. Unit power and a reserved capacity of the storage battery apparatus 220 of BT #189 are similar to unit power and a reserved capacity of the storage battery apparatus 220 of BT #3.

Figure 10:
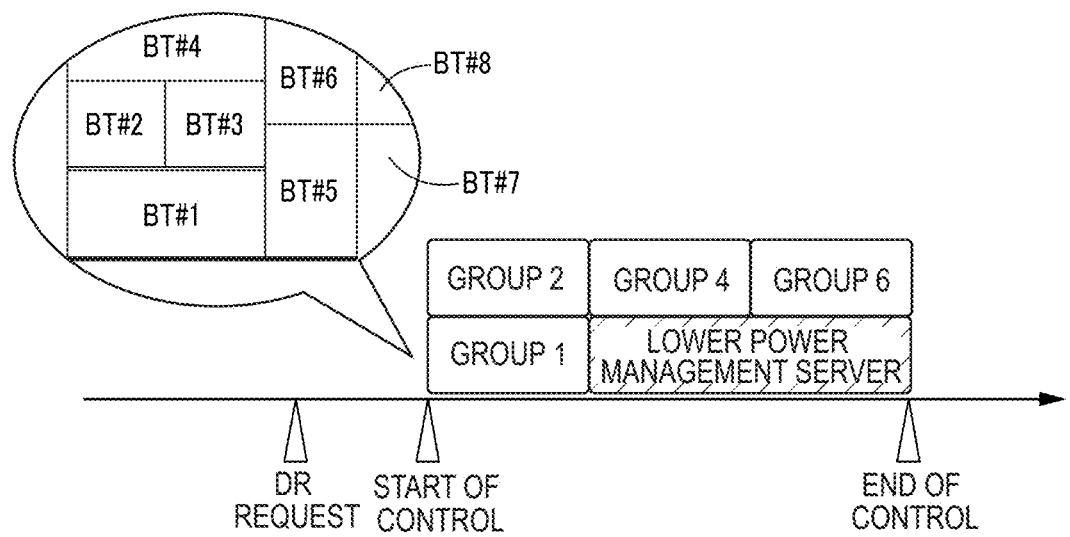
FIG. 10 is a view for describing an operation plan according to an embodiment.

In the embodiment, the upper power management server 400 may group the storage battery apparatuses 220 controlled by the lower power management server 300 into one group as illustrated in FIG. 10. In other words, the upper power management server 400 may consider the storage battery apparatuses 220 controlled by the lower power management server 300 as one unit, rather than considering the storage battery apparatuses 220 controlled by the lower power management server 300 as individuals. In this case, similarly to the local control apparatus 240, the lower power management server 300 transmits, to the upper power management server 400, the reserved capacity information described above of the storage battery apparatuses 220 controlled by the lower power management server 300 as one unit.

In the example illustrated in FIG. 10, a sum of unit power of the storage battery apparatuses 220 belonging to a group associated with the lower power management server 300 is 1000 kW. In the example illustrated in FIG. 8, a sum of adjustment durations of the storage battery apparatuses 220 belonging to a group associated with the lower power management server 300 is two hours.

(Power Supply Control Method)

Hereinafter, a power supply control method according to an embodiment will be described. Hereinafter, a case where the first protocol is a protocol conforming to OpenADR 2.0 and the second protocol is a protocol conforming to ECHONET Lite is described by way of example.

As illustrated in FIG. 11, in step S11, the upper power management server 400 transmits, to the local control apparatus 240 (for example, the facilities 200A to 200C illustrated in FIG. 1), a message (oadrCreateReport) for requiring transmission of the reserved capacity information.

In step S12, the local control apparatus 240 transmits, to the upper power management server 400, a message (oadrCreatedReport) containing the reserved capacity information.

In step S13, the lower power management server 300 transmits, to the local control apparatus 240 (for example, the facilities 200D to 200F illustrated in FIG. 1), a message (oadrCreateReport) for requiring transmission of the reserved capacity information.

In step S14, the local control apparatus 240 transmits, to the lower power management server 300, a message (oadrCreatedReport) containing the reserved capacity information.

In step S15, the upper power management server 400 transmits, to the lower power management server 300, a message (oadrCreateReport) for requiring transmission of the reserved capacity information.

In step S16, the lower power management server 300 transmits, to the upper power management server 400, a message (oadrCreatedReport) containing the reserved capacity information.

Here, the upper power management server 400 may consider the storage battery apparatuses 220 controlled by the lower power management server 300 as one unit as illustrated in FIG. 10. However, the embodiment is not limited thereto. The upper power management server 400 may also receive reserved capacity information of each facility 200 from the lower power management server 300.

In step S17, the upper power management server 400 determines the adjustment plan based on the reserved capacity information received in steps S12 and S16.

Here, the upper power management server 400 may determine the storage battery apparatuses 220 to be used in the adjustment plan in a descending order of magnitude of unit power of the storage battery apparatuses 220. The upper power management server 400 may determine the storage battery apparatuses 220 to be used in the adjustment plan in a descending order of length of adjustment durations calculated based on the unit power and the reserved capacities of the storage battery apparatuses 220. In addition, the upper power management server 400 may determine the adjustment plan in a group unit as illustrated in FIG. 8 or the like.

In step S18, the upper power management server 400 transmits, to the local control apparatus 240, a control message (oadrDistributeEvent) for controlling the storage battery apparatus 220 based on the adjustment plan. Further, the upper power management server 400 may transmit the control message (oadrDistributeEvent) to the local control apparatus 240 through the lower power management server 300.

In step S19, the local control apparatus 240 transmits, to the storage battery apparatus 220, a message (SET command) for controlling the storage battery apparatus 220 based on the control message. It should be noted that the SET command may also be written as a Set command in the protocol conforming to ECHONET Lite.

In step S20, the storage battery apparatus 220 transmits, to the local control apparatus 240, a response message (SET response command) to the message received in step S19. It should be noted that the SET command response may also be described as a Set response command in the protocol conforming to ECHONET Lite.

In step S21, the local control apparatus 240 transmits, to the upper power management server 400, a response message (oadrCreatedEvent) to the control message received in step S18. The local control apparatus 240 may transmit a response message (oadrCreatedEvent) to the upper power management server 400 through the lower power management server 300.

(Action and Effect)

In the embodiment, the reserved capacity is reserved as a capacity to be used for the adjustment of the demand and supply balance of the power grid 110 in the storage capacity of the storage battery apparatus 220. Under such a premise, the upper power management server 400 determines the adjustment plan based on the reserved capacity information specifying the reserved capacity. With this configuration, it is possible to conveniently and appropriately adjust the demand and supply balance of the power grid 110 by using the storage battery apparatus 220 provided in the facility 200 without always checking a capacity usable for the adjustment of the power demand and supply balance of the power grid 110.

Other Embodiments

Although the present disclosure has been described with the above-described embodiment, it should not be understood that the descriptions and the drawings corresponding to a part of the present disclosure limit the present invention. Various alternative embodiments, examples, and operation techniques will be apparent to those skilled in the art from the present disclosure.

In the embodiment, a case where the demand and supply balance of the power grid 110 is adjusted by the discharge operation of the storage battery apparatus 220 has been mainly described. However, the embodiment is not limited thereto. The demand and supply balance of the power grid 110 may be adjusted by the charge operation of the storage battery apparatus 220.

Although not particularly mentioned in the embodiment, the local control apparatus 240 provided in the facility 200 may not necessarily be provided in the facility 200. For example, a part of functions of the local control apparatus 240 may be provided by a cloud server provided on the Internet. That is, it may be considered that the local control apparatus 240 includes the cloud server.

In the embodiment, the power supply control system including the lower power management server 300 and the upper power management server 400 has been described by way of example. However, the embodiment is not limited thereto. The power supply control system may not include the lower power management server 300.

In the embodiment, a case where the power management server determining the adjustment plan is the upper power management server 400 has been described by way of example. However, the embodiment is not limited thereto. The power management server determining the adjustment plan may be the lower power management server 300. In this case, the lower power management server 300 may have the same configuration as that of the upper power management server 400 illustrated in FIG. 3.

In the embodiment, a case where the first protocol is a protocol conforming to OpenADR 2.0 and the second protocol is a protocol conforming to ECHONET Lite has been described by way of example. However, the embodiment is not limited thereto. The first protocol may be a protocol standardized as a protocol used for the communication between the upper power management server 400 and the local control apparatus 240, the communication between the lower power management server 300 and the local control apparatus 240, or the communication between the upper power management server 400 and the lower power management server 300. The second protocol may be a protocol standardized as a protocol used in the facility 200.

It should be noted that the entire content of Japanese Patent Application No. 2017-012840 (filed on Jan. 27, 2017) is incorporated herein by reference.

The invention claimed is:

1. A power supply control method, comprising:
   determining, by a power management server managing at least one facility connected to a power grid, an adjustment plan for adjusting demand and supply balance of the power grid by using at least one storage battery apparatus provided in the facility;
   transmitting, from the power management server to a control apparatus managed by the power management server, a control message for controlling the storage battery apparatus, based on the adjustment plan; and
   transmitting, from the control apparatus to the power management server, reserved capacity information specifying a reserved capacity reserved as a capacity to be used for adjustment of demand and supply balance of the power grid in a storage capacity of the storage battery apparatus,
   wherein
   the determining includes determining the adjustment plan based on the reserved capacity information, and
   the power supply control method further comprises:
      detecting a non-operating storage battery apparatus which cannot perform a discharge operation or a charge operation among the storage battery apparatuses used in the adjustment plan; and
      specifying an alternative storage battery apparatus used as an alternative to the non-operating storage battery apparatus, wherein the specifying includes specifying, as the alternative storage battery apparatus, a storage battery apparatus having characteristics similar to unit power of the non-operating storage battery apparatus and the reserved capacity of the non-operating storage battery apparatus.

2. The power supply control method according to claim 1, wherein the reserved capacity is set separately from an amount of power consumed by a load provided in the facility.

3. The power supply control method according to claim 1, wherein the reserved capacity is set separately from an amount of power secured for emergency occurring in the facility.

4. The power supply control method according to claim 1, wherein the reserved capacity information is information indicating the storage capacity and a proportion of the reserved capacity to the storage capacity, or information indicating an absolute value of the reserved capacity.

5. The power supply control method according to claim 1, wherein the reserved capacity information includes information indicating the unit power which is at least any one of unit discharged power of the storage battery apparatus and unit charged power of the storage battery apparatus.

6. The power supply control method according to claim 1, wherein
the at least one storage battery apparatus comprises a plurality of the storage battery apparatuses, and
the determining further includes determining the storage battery apparatuses to be used in the adjustment plan in a descending order of magnitude of the unit power of the storage battery apparatuses.

7. The power supply control method according to claim 1, wherein
the at least one storage battery apparatus comprises a plurality of the storage battery apparatuses, and
the determining further includes determining the storage battery apparatuses to be used in the adjustment plan in a descending order of length of adjustment durations calculated based on the unit power and the reserved capacities of the storage battery apparatuses.

8. The power supply control method according to claim 1, wherein the at least one storage battery apparatus comprises a plurality of the storage battery apparatuses.

9. The power supply control method according to claim 1, wherein the control apparatus is at least any one of a power management apparatus managing one facility, and a power management apparatus managing two or more facilities.

10. The power supply control method according to claim 1, wherein
the at least one storage battery apparatus comprises a plurality of the storage battery apparatuses, and
the determining further includes
grouping the storage battery apparatuses into two or more groups based on the reserved capacity information, and
determining the adjustment plan in a group unit.

11. A power management server managing at least one facility connected to a power grid, the power management server comprising:
a controller configured to determine an adjustment plan for adjusting demand and supply balance of the power grid by using at least one storage battery apparatus provided in the facility;
a transmitter configured to transmit, to a control apparatus managed by the power management server, a control message for controlling the storage battery apparatus, based on the adjustment plan; and
a receiver configured to receive, from the control apparatus, reserved capacity information specifying a reserved capacity reserved as a capacity to be used for adjustment of demand and supply balance of the power grid in a storage capacity of the storage battery apparatus,
wherein
the controller is configured to determine the adjustment plan based on the reserved capacity information, and
the controller is configured to
detect a non-operating storage battery apparatus which cannot perform a discharge operation or a charge operation among the storage battery apparatuses used in the adjustment plan, and
specify an alternative storage battery apparatus used as an alternative to the non-operating storage battery apparatus, wherein the controller is configured to specify, as the alternative storage battery apparatus, a storage battery apparatus having characteristics similar to unit power of the non-operating storage battery apparatus and the reserved capacity of the non-operating storage battery apparatus.

12. A control apparatus managed by a power management server managing at least one facility connected to a power grid, the control apparatus comprising:
a receiver configured to receive, from the power management server, a control message for controlling at least one storage battery apparatus provided in the facility; and
a transmitter configured to transmit, to the power management server, reserved capacity information specifying a reserved capacity reserved as a capacity to be used for adjustment of demand and supply balance of the power grid in a storage capacity of the storage battery apparatus,
wherein
the control message is transmitted based on an adjustment plan for adjusting the demand and supply balance of the power grid by using the storage battery apparatus,
the adjustment plan is determined based on the reserved capacity information, and
the transmitter is configured to transmit a message to the power management server to cause the power management server to
detect a non-operating storage battery apparatus which cannot perform a discharge operation or a charge operation among the storage battery apparatuses used in the adjustment plan, and
specify an alternative storage battery apparatus used as an alternative to the non-operating storage battery apparatus, wherein the transmitter is configured to transmit the message to the power management server to specify, as the alternative storage battery apparatus, a storage battery apparatus having characteristics similar to unit power of the non-operating storage battery apparatus and the reserved capacity of the non-operating storage battery apparatus.

13. A power supply control system comprising:
a power management server configured to manage at least one facility connected to a power grid; and
a control apparatus configured to be managed by the power management server,
wherein
the power management server is configured to determine an adjustment plan for adjusting demand and supply balance of the power grid by using at least one storage battery apparatus provided in the facility,
the power management server is configured to transmit, to the control apparatus, a control message for controlling the storage battery apparatus,
the control apparatus is configured to transmit reserved capacity information specifying a reserved capacity reserved as a capacity to be used for adjustment of demand and supply balance of the power grid in a storage capacity of the storage battery apparatus,
the power management server is configured to determine the adjustment plan based on the reserved capacity information, and
the power management server is further configured to
detect a non-operating storage battery apparatus which cannot perform a discharge operation or a charge operation among the storage battery apparatuses used in the adjustment plan, and specify an alternative storage battery apparatus used as an alternative to the non-operating storage battery apparatus, wherein the power management server is configured to specify, as the alternative storage battery apparatus, a storage battery apparatus having characteristics similar to unit power of the non-operating storage battery apparatus and the reserved capacity of the non-operating storage battery apparatus.

* * * * *